United States Patent [19]
Gueguen et al.

[11] Patent Number: 5,494,106
[45] Date of Patent: Feb. 27, 1996

[54] METHOD FOR SEALING BETWEEN A LINING AND BOREHOLE, CASING OR PIPELINE

[75] Inventors: Jean-Marie Gueguen, Maisons Laffitte; Jean-Louis Saltel; Frédéric Signori, both of Le Rheu, all of France

[73] Assignee: Drillflex, Chatillon-Sur-Seiche, France

[21] Appl. No.: 409,198

[22] Filed: Mar. 23, 1995

[30] Foreign Application Priority Data

Mar. 23, 1994 [FR] France .................................. 94 03629

[51] Int. Cl.⁶ .................................................. E21B 29/00
[52] U.S. Cl. .......................... 166/277; 166/387; 264/269
[58] Field of Search ................................ 166/120, 179, 166/196, 277, 387

[56] References Cited

U.S. PATENT DOCUMENTS

| | | | |
|---|---|---|---|
| 1,641,035 | 8/1927 | Hero | 166/179 X |
| 3,354,955 | 11/1967 | Berry | 166/277 |
| 3,489,220 | 1/1970 | Kinley | 166/277 |
| 4,270,761 | 6/1981 | Hertz | 166/147 X |
| 5,337,823 | 8/1994 | Nobileau | 166/277 |

FOREIGN PATENT DOCUMENTS

| | | | |
|---|---|---|---|
| 0192597 | 8/1986 | European Pat. Off. | F16L 55/16 |
| 0413495 | 8/1990 | European Pat. Off. | F16L 55/162 |
| 2704898 | 3/1993 | France . | |
| 2703102 | 3/1993 | France . | |
| 9313379 U | 12/1993 | Germany | F16L 55/162 |
| 2017853 | 1/1979 | United Kingdom | F16L 21/02 |
| WO-A-9118180 | 11/1991 | WIPO | E21B 17/00 |

*Primary Examiner*—Roger J. Schoeppel
*Attorney, Agent, or Firm*—Blakely, Sokoloff, Taylor & Zafman

[57] ABSTRACT

To seal the connection between an internal lining and external borehole, casing or pipeline, one or more elastically deformable annular seals are placed on the preform in a contracted state, in a configuration which does not impede insertion of the preform into the borehole, casing or pipeline. During expansion of the preform the seal itself forms an annular groove for receiving it in the exterior surface of the preform. After hardening of the preform a rigid lining is obtained having an integral seal. Applications include repair of boreholes, casings, especially in oil wells, or pipelines, by internal lining.

10 Claims, 2 Drawing Sheets

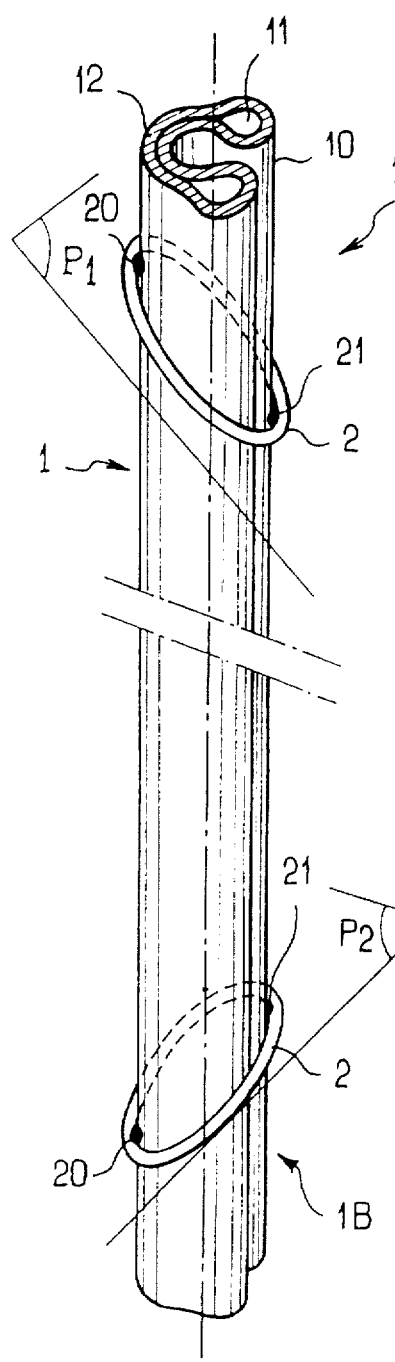
FIG_1
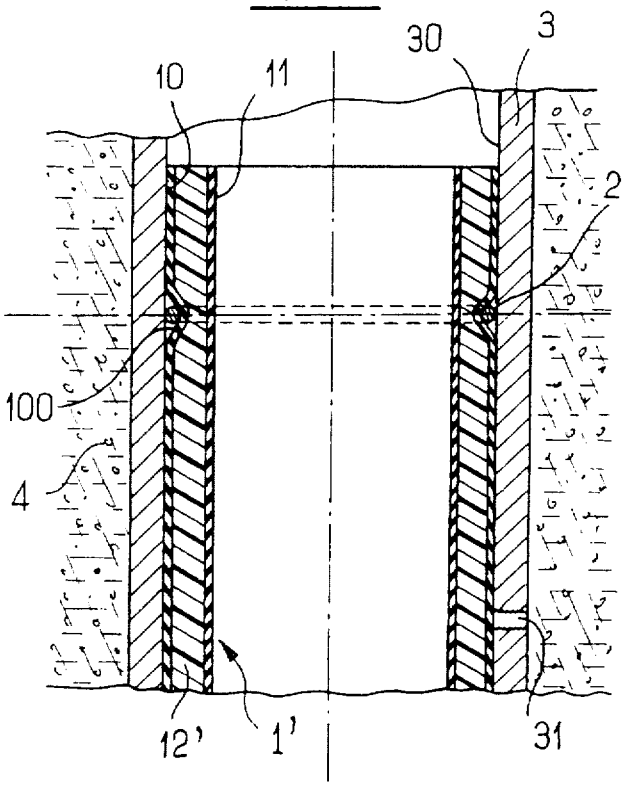
FIG_2
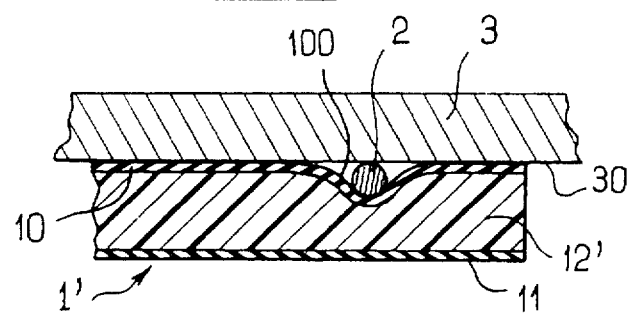
FIG_3
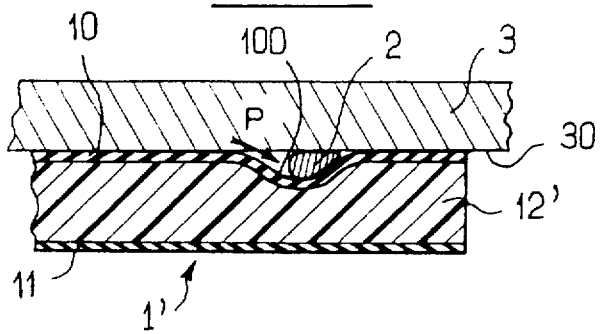
FIG_3A

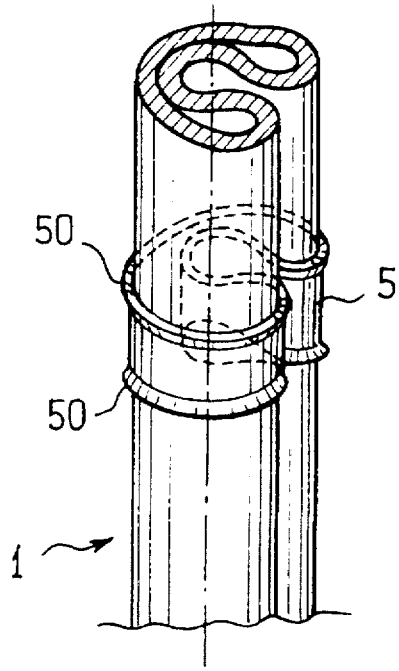
FIG_4
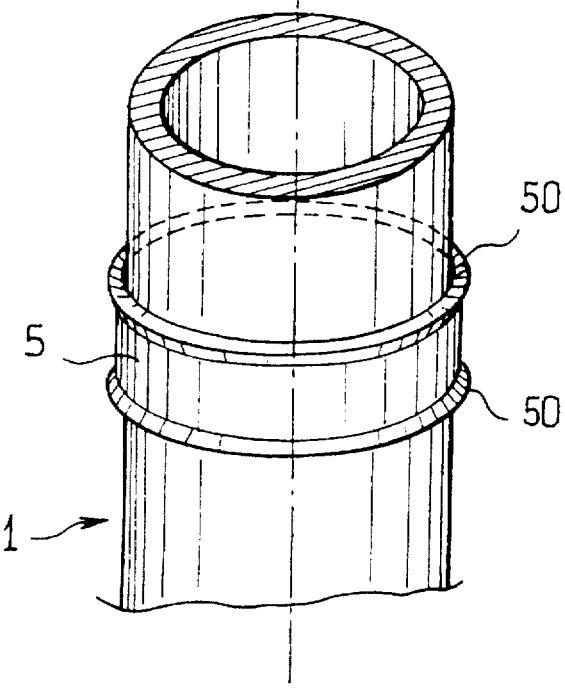
FIG_5
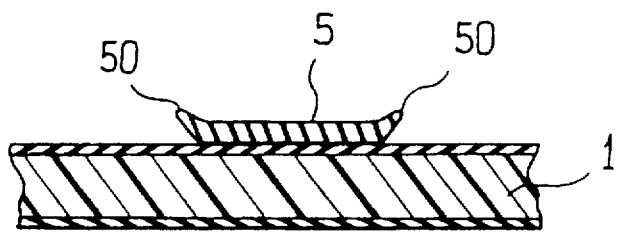
FIG_6
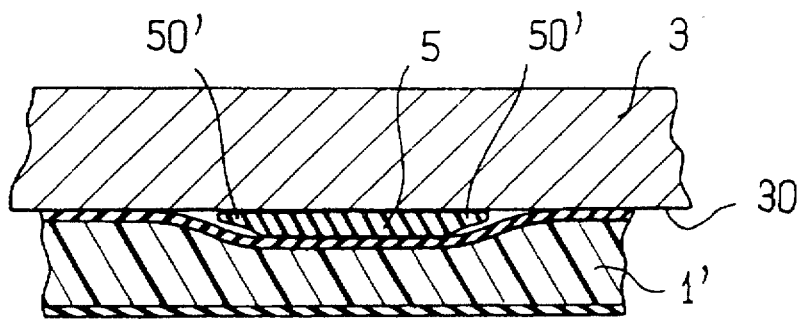
FIG_6A

METHOD FOR SEALING BETWEEN A LINING AND BOREHOLE, CASING OR PIPELINE

BACKGROUND OF THE INVENTION

1. Field of the Invention

The present invention concerns a method for sealing the space between an interior lining and a borehole, an exterior casing or an exterior cylindrical pipeline in which it is accommodated.

2. Description of the Prior Art

It is more particularly concerned with a method for use with a lining formed from a tubular preform with a flexible and radially deformable wall, hardenable in situ, the preform being adapted to occupy a first or contracted state in which its greatest transverse dimension is substantially less than the inside diameter of the borehole, the casing or the pipeline and a second or expanded state in which its outside surface has a cylindrical shape the diameter of which is substantially equal to the inside diameter of the borehole, the casing or the pipeline, the preform being hardened when it is in the expanded state inside the borehole, the casing or the pipeline to form a rigid lining therein.

A preform of this kind and the method of installing it are described in the following documents, among others: WO-A-91 18180, FR-A-2 703 102 and FR-A-2 704 898.

A lining of this type is particularly suitable for repairing oil well casings or a damaged (for example perforated) section of the wall of a pipeline such as a gas pipeline or an oil pipeline.

To this end the contracted preform is inserted into the casing or the pipeline and moved up to the area to be repaired, where it is fitted and then expanded into intimate contact with the surface of the inside wall of the casing or the pipeline, after which it is hardened.

The wall of the preform is usually made from a thermosetting resin reinforced with fibers and hardened is achieved by heating (by the Joule effect or by means of a hot liquid introduced into the preform).

This method is satisfactory.

However, there is not always a good seal between the lining and the borehole, the casing or the pipeline around it.

In some cases liquids or gases in the soil can pass through perforations or other openings in the wall of the borehole, casing or pipeline, finding their way into the annular space between the lining and the borehole, casing or pipeline, and eventually flowing into the interior of the latter.

The pressure of the liquid or the gas in this annular space, even if it has a size on the micrometer scale, firstly causes the lining to contract and secondly causes the borehole, casing or pipeline to expand, so increasing the size of said annular space and degrading the seal.

To our knowledge there is no simple method of achieving a good seal at this location.

An object of the present invention is to propose such a method.

SUMMARY OF THE INVENTION

The present invention consists in a method of sealing the peripheral space between an interior lining and an exterior cylindrical borehole, casing or pipeline in which it is accommodated, the lining being obtained from a radially deformable flexible wall tubular preform adapted to be hardened in situ, said preform being adapted to occupy a first or contracted state in which its greatest transverse dimension is substantially less than the inside diameter of said borehole, casing or pipeline and a second or expanded state in which its external surface has a cylindrical shape with a diameter substantially equal to the inside diameter of said borehole, casing or pipeline, said preform being hardened when it is in said expanded state within said borehole, casing or pipeline so that it forms a rigid lining, in which method, when said preform is in said contracted state, at least one elastically deformable annular seal is placed around it, said seal having imparted to it a configuration which does not impede insertion of said preform into said borehole, casing or pipeline, after which said preform with its seal(s) is installed inside said borehole, casing or pipeline, after which said preform is radially expanded, one effect of which is to expand said seal at the same time as an annular groove is formed in line with it in the exterior surface of said preform, and finally said preform is hardened to provide a rigid lining having a seal integrated in said groove.

In this method, it is the seal itself, so to speak, which forms its own receiving groove in the exterior surface of the preform, during expansion and solidification of the latter.

It is particularly simple and advantageous if the seal is an O-ring, i.e. has a circular cross-section.

In a different embodiment the seal has a flat cross-section with flexible lips at the edges.

The invention lends itself particularly well to use with a preform comprising a thermosetting resin core sandwiched between inner and outer skins.

In one embodiment of the invention the seal is inherently circular in shape, and is applied to the preform on a slant so that it assumes an oval shape, the effect of expansion of the seal being to return it to its inherent circular shape, locating it in a transverse plane.

In one embodiment of the invention the seal is fixed permanently to the preform at one point.

This ensures that it occupies a defined position in the lining.

The seal is preferably also fixed temporarily to the preform at a second point at least, by a connection which is automatically broken when the preform is expanded.

With this arrangement the seal is firmly attached to the preform during the insertion and placing of the latter, in the contracted state, into the borehole, casing or pipeline.

In a different embodiment of the invention the seal is glued to the preform.

In a preferred embodiment of the invention two seals are provided in the end regions of the preform.

The pair of seals isolates perfectly both ends of the damaged and lined area of the casing or pipeline.

Other features and advantages of the invention will emerge from the description and the appended drawings which show one preferred embodiment of the invention.

BRIEF DESCRIPTION OF THE DRAWINGS

FIG. 1 is a diagrammatic perspective view of a preform in the contracted state and fitted with two O-rings in its end portions.

FIG. 2 is a view in transverse section of one end of the lining made from the preform shown in FIG. 1, after installation inside a faulty casing.

FIG. 3 shows part of FIG. 2 including the seal between the lining and the casing.

FIG. 3A is a view similar to FIG. 3 showing how the seal is deformed by fluid pressure.

FIG. 4 is a view similar to FIG. 1 showing one end only of the preform fitted with a lip seal of flat crosssection.

FIG. 5 shows the end of the preform from FIG. 4 in the unfolded state (not inside a casing).

FIG. 6 shows part of the preform from FIG. 5 and its seal, in section on a radial plane.

FIG. 6A is a view similar to FIG. 6, after installation and expansion in a casing.

DETAILED DESCRIPTION OF THE PREFERRED EMBODIMENTS

The preform 1 shown in FIG. 1 is a preform of the same general type as that described in WO-A-91 18180.

It is a tubular preform with a flexible wall formed by an outer skin 10, an inner skin 11 and a core 12.

The material of a core 12 is soft but can be hardened.

For example, it is a thermosetting resin that is polymerized by heating, the resin being reinforced with fibers (of glass or carbon, for example) that are not shown.

The skins 10 and 11 are made from an impermeable flexible synthetic material, preferably slightly elastic.

The preform 1 is folded longitudinally on itself so that all its transverse dimensions are significantly less than the inside diameter of the casing to be lined.

Means that are not shown, such as ties that automatically rupture when a given traction force is applied, hold the preform in its contracted state.

In accordance with the invention, two sealing rings 2 are fitted around respective end portions 1A, 1B of the preform 1.

The rings 2 are standard type O-rings, slightly expandable, made from an elastomer material such as polytetrafluorethylene (PTFE).

These seals are elastically deformable and are fixed to the preform at a point 20 by means of a spot of mechanically strong glue, for example. Each seal 2 surrounds the preform and is slantwise to it so that it is in intimate contact with its wall; thus each seal 2 assumes an elongate oval shape in a respective plane P1, P2 at an angle to the longitudinal axis of the preform.

A second, but temporary fixing 21 attaches the seals 2 to the preform. This fixing is also by means of a spot of glue, for example, but of significantly lower mechanical strength.

The preform has dimensions such that in the expanded state its outside diameter corresponds to the inside diameter of the borehole, casing or pipeline to be lined. Likewise, the outside diameter of the 0-rings 2 corresponds to this inside diameter.

FIG. 2 shows the casing 3 of a vertical borehole in soil 4 with a perforation 31 in its wall.

For example, it is a metal casing perforated as the result of corrosion.

The casing has an inside wall 30.

To line the fissured region of the casing, the first step is to install the preform 1 with its seals 2 in the casing. Once the preform has been lowered to the required position, in line with the perforation 31, it is expanded by introducing a liquid into the interior of the preform.

Expansion causes the preform to change from its folded and contracted shape (FIG. 1) to a cylindrical shape. The effect of this deformation of the preform is firstly to break the ties holding it in its contracted state and secondly to break the less strong spots of glue 21. The mechanical forces exerted on the seals 2 during this change in the state of the preform obliges the seals—which are at this stage retained at only one point, namely the point 20—to move gradually into a transverse plane whilst simultaneously resuming their inherent toroidal shape.

On completion of expansion, each seal 2 is therefore in the position shown in FIG. 2, between the skin 10 of the preform and the inside surface 30 of the casing 3, in a transverse plane (Q).

The pressure inside the preform presses it into intimate contact with the wall 30, except at the location of the seals 2 where its radial expansion is resisted. An annular cup 100 forms in the region of the seal. This is made possible by the malleable nature of the core 12.

The groove 100 has a generally V-shaped section, with an obtuse angle and a rounded bottom, following the curvature of the cross-section of the seal 2.

The core 12 is then hardened by application of heat. This produces a rigid wall lining 1' with solidified core 12'. Each end region of the lining has an annular seal accommodated in a groove formed in its outside wall surface.

FIG. 3A shows the deformation of the cross-section of the seal due to the application of a pressure P generated by a fluid which has infiltrated between the wall 30 and the skin 10. This can be mud from the soil 4 which has made its way through the perforation 31. This fluid pressure pushes the seal axially out of the groove and because of its deformable nature the cross-section of the seal assumes the shape of a wedge fitting into the convergent space between the edges of the groove 100 and the wall 30. The seal is self-wedged into the groove, which is particularly beneficial in that the higher the pressure P the greater is the wedging effect and the correlative sealing effect.

The preform 1 shown in FIGS. 4 to 6 has a seal 5 different from the O-ring 2. This is an annular seal with an elongate rectangular cross-section—flattened cross-section—with raised edges forming flexible lips 50. This type of seal is well known. It is glued around the preform, substantially in a transverse plane. Because of its flexibility, it can be folded longitudinally at the same time as the preform 1 (FIG. 4) and can also be unfolded as the preform is unfolded (FIG. 5).

Like the O-ring, the "flat" seal 5 forms its own groove in the preform during its expansion and hardening, so that at the end of this operation it is integrated into the lining 1. The flexible lips 50' are bent inwards by the wall 30 of the casing 3, which provides a perfect seal at both edges of the seal 5. Of course, a plurality of seals 5 can be provided on the preform, for example one seal at each end.

In one possible embodiment of the invention circular grooves are provided in the outer skin 10, for example V-section grooves, each adapted to receive a seal 2. They are shallow but have sufficient depth to locate the seals initially and to retain them on the preform during its installation in the well, casing or pipeline.

The method of the present invention provides a highly effective seal using low-cost means and in a simple manner.

Although the invention has been described with reference to a preform which is expanded radially simply by unfolding it, it goes without saying that it applies to any type of radially expandable preform, for example the preform having the braided wick structure described in FR-A-2 704 898 already mentioned. It also applies to preforms that are not initially folded, but which are expanded purely radially.

There is claimed:

1. Method of sealing the peripheral space between an interior lining and an exterior cylindrical borehole, casing or pipeline in which it is accommodated, the lining being obtained from a radially deformable flexible wall tubular preform adapted to be hardened in situ, said preform being adapted to occupy a first or contracted state in which its greatest transverse dimension is substantially less than the inside diameter of said borehole, casing or pipeline and a second or expanded state in which its external surface has a cylindrical shape with a diameter substantially equal to the inside diameter of said borehole, casing or pipeline, said preform being hardened when it is in said expanded state within said borehole, casing or pipeline so that it forms a rigid lining, in which method, when said preform is in said contracted state, at least one elastically deformable annular seal is placed around it, said seal having imparted to it a configuration which does not impede insertion of said preform into said borehole, casing or pipeline, after which said preform with its seal is installed inside said borehole, casing or pipeline, after which said preform is radially expanded, one effect of which is to expand said seal at the same time as an annular groove is formed in line with it in the exterior surface of said preform, and finally said preform is hardened to provide a rigid lining having a seal integrated in said groove.

2. Method according to claim 1 wherein said seal is an O-ring.

3. Method according to claim 1 wherein said seal has a flattened cross-section with flexible lips at the edges.

4. Method according to claim 1 wherein the wall of said preform is hardenable by heat.

5. Method according to claim 4 wherein said preform comprises a thermosetting resin core sandwiched between an inner skin and an outer skin.

6. Method according to claim 1 wherein said seal is inherently circular in shape and is applied slantwise to said preform so as to assume an oval shape, one effect of expansion of said seal being to return it to its inherent circular shape, and to locate it in a transverse plane.

7. Method according to claim 1 wherein said seal is fixed permanently to said preform at one point.

8. Method according to claim 7 wherein said seal is fixed temporarily to said preform at at least a second point, this fixing being automatically broken when said preform is expanded.

9. Method according to claim 1 wherein said seal is glued to said preform.

10. Method according to claim 1 wherein two seals are disposed on respective end regions of said preform.

* * * * *

UNITED STATES PATENT AND TRADEMARK OFFICE
CERTIFICATE OF CORRECTION

PATENT NO. : 5,494,106
DATED : February 27, 1996
INVENTOR(S) : Gueguen et al.

It is certified that error appears in the above-identified patent and that said Letters Patent is hereby corrected as shown below:

In column 3 at line 5, please delete " crossesection " and insert -- cross-section --.

Signed and Sealed this

Tenth Day of December, 1996

Attest:

BRUCE LEHMAN

*Attesting Officer*   *Commissioner of Patents and Trademarks*